United States Patent
Szilagyi

(10) Patent No.: US 7,117,673 B2
(45) Date of Patent: Oct. 10, 2006

(54) ACTUATOR FOR TWO ANGULAR DEGREES OF FREEDOM

(75) Inventor: Andrei Szilagyi, Danville, CA (US)

(73) Assignee: Alfmeier Prazision AG Baugruppen Und Systemlosungen, Treuchtlingen (DE)

( * ) Notice: Subject to any disclaimer, the term of this patent is extended or adjusted under 35 U.S.C. 154(b) by 0 days.

(21) Appl. No.: 10/431,174

(22) Filed: May 6, 2003

(65) Prior Publication Data

US 2004/0035108 A1 Feb. 26, 2004

Related U.S. Application Data

(60) Provisional application No. 60/378,619, filed on May 6, 2002.

(51) Int. Cl.
*F01B 29/10* (2006.01)
(52) U.S. Cl. .......................................... 60/528; 60/527
(58) Field of Classification Search ................... 60/527, 60/528, 529

See application file for complete search history.

(56) References Cited

U.S. PATENT DOCUMENTS

| | | |
|---|---|---|
| 348,841 A | 9/1886 | Hainley |
| 1,658,669 A | 2/1928 | Cohn et al. |
| 2,518,941 A | 8/1950 | Satchwell et al. |
| 2,975,307 A | 3/1961 | Schroeder et al. |
| 3,452,175 A | 6/1969 | Wilkes |
| 3,452,309 A | 6/1969 | Wilkes |
| 3,641,296 A | 2/1972 | Schwarz |
| 3,725,835 A | 4/1973 | Hopkins et al. |
| 3,940,935 A | 3/1976 | Richardson et al. |
| 4,027,953 A | 6/1977 | Jacob |
| 4,150,544 A | 4/1979 | Pachter |
| 4,553,393 A * | 11/1985 | Ruoff .......................... 60/528 |
| 4,559,512 A | 12/1985 | Yaeger et al. |
| 4,579,006 A | 4/1986 | Hosoda et al. |
| 4,586,335 A | 5/1986 | Hosoda et al. |
| 4,626,085 A | 12/1986 | Suzuki |
| 4,742,680 A | 5/1988 | Mecca |
| 4,751,821 A | 6/1988 | Birchard |
| 4,806,815 A | 2/1989 | Honma |
| 4,811,564 A | 3/1989 | Palmer |
| 4,829,767 A | 5/1989 | Mecca |
| 4,841,730 A | 6/1989 | McDonald |
| 4,884,557 A | 12/1989 | Takehana et al. |

(Continued)

FOREIGN PATENT DOCUMENTS

DE 4209815 A1 9/1993

(Continued)

OTHER PUBLICATIONS

Aircraft Maneuverability, http://www.cs.ualberta.ca/~database/MEMS/sma_mems/flap.html, last modified Aug. 17, 2001, printed Apr. 17, 2003, pp. 1-2.

(Continued)

*Primary Examiner*—Hoang Nguyen
(74) *Attorney, Agent, or Firm*—Dority & Manning, P.A.

(57) ABSTRACT

An apparatus for two degree of freedom positioning a moveable structure relative to a support structure is provided. The apparatus includes a moveable structure, a support structure, a compliant support disposed between the moveable structure and the support structure. The compliant support biases the moveable structure away from the support structure. In addition, three shape memory alloy actuators are provided between the structures and symmetrically arranged about the compliant support. The shape memory alloy actuators are selectively activated to provide two degrees of freedom of movement for the moveable structure relative to the support structure.

18 Claims, 10 Drawing Sheets

U.S. PATENT DOCUMENTS

| | | | |
|---|---|---|---|
| 4,932,210 A | | 6/1990 | Julien et al. |
| 4,977,886 A | | 12/1990 | Takehana et al. |
| 5,014,520 A | | 5/1991 | Orner et al. |
| 5,092,781 A | | 3/1992 | Casciotti et al. |
| 5,127,228 A | | 7/1992 | Swenson |
| 5,129,753 A | | 7/1992 | Wesley et al. |
| 5,165,897 A | | 11/1992 | Johnson |
| 5,166,832 A | | 11/1992 | Zychowicz |
| 5,172,551 A | | 12/1992 | Nakajima et al. |
| 5,182,910 A | * | 2/1993 | Benecke ............... 60/529 |
| 5,235,225 A | | 8/1993 | Colgate et al. |
| 5,306,979 A | * | 4/1994 | Schwarz, Jr. ............ 310/328 |
| 5,312,152 A | | 5/1994 | Woebkenberg, Jr. et al. |
| 5,344,506 A | | 9/1994 | DeAngelis |
| 5,345,963 A | * | 9/1994 | Dietiker ................ 137/12 |
| 5,556,370 A | | 9/1996 | Maynard |
| 5,563,466 A | | 10/1996 | Rennex et al. |
| 5,618,066 A | | 4/1997 | Fu-Hsiang |
| 5,662,587 A | * | 9/1997 | Grundfest et al. ......... 600/114 |
| 5,685,148 A | | 11/1997 | Robert |
| 5,747,993 A | | 5/1998 | Jacobsen et al. |
| 5,763,979 A | | 6/1998 | Mukherjee et al. |
| 5,770,913 A | | 6/1998 | Mizzi |
| 5,771,742 A | | 6/1998 | Bokaie et al. |
| 5,829,253 A | | 11/1998 | Long et al. |
| 5,901,554 A | | 5/1999 | Greschik |
| 5,917,260 A | | 6/1999 | Garcia et al. |
| 6,019,113 A | | 2/2000 | Allston et al. |
| 6,069,420 A | | 5/2000 | Mizzi et al. |
| 6,126,115 A | | 10/2000 | Carrier et al. |
| 6,164,784 A | | 12/2000 | Butera et al. |
| 6,218,762 B1 | | 4/2001 | Hill et al. |
| 6,326,707 B1 | | 12/2001 | Gummin et al. |
| 6,327,855 B1 | | 12/2001 | Hill et al. |
| 6,333,583 B1 | | 12/2001 | Mahadevan et al. |
| 6,364,496 B1 | | 4/2002 | Boddy et al. |
| 6,374,608 B1 | | 4/2002 | Corris et al. |
| 6,404,098 B1 | | 6/2002 | Kayama et al. |
| 6,434,333 B1 | | 8/2002 | Tanaka et al. |
| 6,450,064 B1 | | 9/2002 | Christiansen et al. |
| 6,522,452 B1 | * | 2/2003 | Wood ................ 359/290 |
| 6,574,958 B1 | | 6/2003 | MacGregor |
| 6,881,074 B1 | * | 4/2005 | McLenaghan ............ 439/70 |

FOREIGN PATENT DOCUMENTS

| | | |
|---|---|---|
| DE | 19509177 A1 | 9/1996 |
| EP | 0147491 A1 | 7/1985 |
| FR | 77 09117 | 10/1978 |
| FR | 2730766 | 8/1996 |
| GB | 2093589 A | 9/1982 |
| GB | 2334046 A | 8/1999 |
| JP | 07 274561 A | 10/1995 |
| KR | 9605617 B1 | 4/1996 |
| KR | 9607599 B1 | 6/1996 |
| WO | WO 98/08355 | 2/1998 |
| WO | WO 01/12985 A1 | 2/2001 |

OTHER PUBLICATIONS

Bokaie, Latch-Release Pin Puller with Shape-Memory Alloy Actuator, Lewis Research Center, http://www.nasatech.com/Briefs/Feb98/LEW16511.html, printed Apr. 17, 2003.

Bone Plates, http://www.cs.ualberta.ca/~database/MEMS/sma_mems/bone.html, last modified Aug. 17, 2001, printed Apr. 17, 2003, pp. 1-2.

Glossary: Pseudo-elasticity (or super-elasticity), http://www.cs.ualberta.ca/~database/MEMS/sma_mems/glossary.cgi, last modified Aug. 17, 2001, printed Apr. 17, 2003, pp. 1-2.

Glossary: Shape Memory Effect, http://www.cs.ualberta.ca/~database/MEMS/sma_mems/glossary.cgi, last modified Aug. 17, 2001, printed Apr. 17, 2003, pp. 1-2.

Grant et al., "Variable Structure Control of Shape Memory Alloy Actuators," *IEEE Control Systems* 17(3):80-88, 1997.

Hashimoto et al., "Application of Shape Memory Alloy to Robotic Actuators," *J. Robotic Systems* 2(1):3-25, 1985.

Hirose et al., "A new design of servo-actuators based on the shape of memory effect," *Theory and Practice of Robots and Manipulators*, 339-349, 1984.

Hodgson et al., Shape Memory Alloys, http://www.sma-inc.com/SMAPaper.html, 1999, printed Apr. 17, 2003, pp. 1-12.

Ikuta et al., "Mathematical model and experimental verification . . . ," *IEEE Robotics and Automation* 4:103-108, 1991.

Ikuta et al., "Shape Memory Alloy Servo Actuator System with Electric Resistance Feedback and Application for Active Endoscope," *Proc. IEEE Int. Conf. On Robotics and Information* 427-430, 1988.

Ikuta, "Micro/Miniature Shape Memory Alloy Actuator," *IEEE Robotics and Automation* 3:2156-2161, 1990.

Kuribayashi, "A New Actuator of a Joint Mechanism Using TiNi Alloy Wire," *Int. J. Robotics* 4(4):47-58, 1986.

Mills JW, "Lukasiewicz' Insect: The Role of Continuous-Valued Logic in a Mobile Robot's Sensors, Control, and Locomotion," in *Siquito: Advanced Experiments with a Simple and Inexpensive Robot* Chapter 12, pp. 197-211, IEEE Computer Society Press, Los Alamitos, CA USA ISBN 0-8186-7408-3, 1993.

Otsuka et al., "Shape Memory Materials," pp. 36-48, Cambridge University Press, Cambridge, England, 1998, ISBN 0-521-44487X.

Rediniotis et al., Development of a Shape-Memory-Alloy Actuated Biomimetic Hydrofoil, Journal fo Intelligent Material Systems and Structures, 13:35-49, 2002.

Robotic Muscles, http://www.cs.ualberta.ca/~database/MEMS/sma_mems/muscle.html, last modified Aug. 17, 2001, printed Apr. 17, 2003, pp. 1-2.

Shape Memory Alloys, http://www.cs.ualberta.ca/~database/MEMS/sma_mems/sma.html, last modified Aug. 17, 2001, printed Apr. 17, 2003, pp. 1-4.

Smith et al., Development of Shape Memory Alloy (SMA) Actuated Mechanisms for Spacecraft Release Applications, SSC99-XI-7, 13th AIAA/USU Conference on Small Satellites.

Technical Characteristics of FLEXINOL™ Actuator Wires, Dynalloy, Inc., printed on Feb. 26, 2001.

WPI Database XP002202662, "Shape memory metal actuator control device—has minimum and maximum detector to monitor state of actuator based on its minimum and maximum allowable impedance," Oct. 20, 1995.

* cited by examiner

ACTUATOR FOR TWO ANGULAR DEGREES OF FREEDOM

CROSS REFERENCE TO RELATED APPLICATION

This application claims benefit under 35 USC 119(e) to U.S. Provisional Patent Application Ser. No. 60/378,619 filed May 6, 2002, entitled "Actuator for Two Angular Degrees of Freedom". The above application is incorporated herein by reference in its entirety.

FIELD OF THE INVENTION

This invention relates generally to a power operated actuator for payload movement. More particularly, this invention relates to the use of shape memory alloy actuators to implement payload movement in two angular dimensions.

BACKGROUND OF THE INVENTION

Mechanical actuators for tilting a payload are well known and have applications ranging from inexpensive rearview mirror assemblies in automobiles to expensive positioning stages for telescopes. While the use of mechanical actuation is known, existing mechanical actuators typically employ a number of servo motors coupled to the payload by a network of pulleys, gears and linkages. Thus, current mechanical actuator assemblies have high part counts, complex workings and are relatively expensive to fabricate. What is needed, therefore, is a relatively simple actuator that is more reliable and less expensive than existing mechanical actuators.

SUMMARY OF THE INVENTION

An apparatus whereby a moveable structure may be positioned in two angular degrees of freedom relative to a support structure is provided. The apparatus includes a moveable structure, a support structure, a compliant support disposed between the moveable structure and the support structure. The compliant support biases the moveable structure away from the support structure. In addition, three shape memory alloy actuators are provided between the structures and are symmetrically arranged about the compliant support. The shape memory alloy actuators are selectively activated to provide tilting of the moveable structure relative to the support structure along two degrees of freedom.

BRIEF DESCRIPTION OF THE DRAWINGS

Other advantages of the present invention will be readily appreciated by referring to the following detailed description in conjunction with the accompanying drawings wherein.

DETAILED DESCRIPTION OF THE PREFERRED EMBODIMENTS

Figure 1:
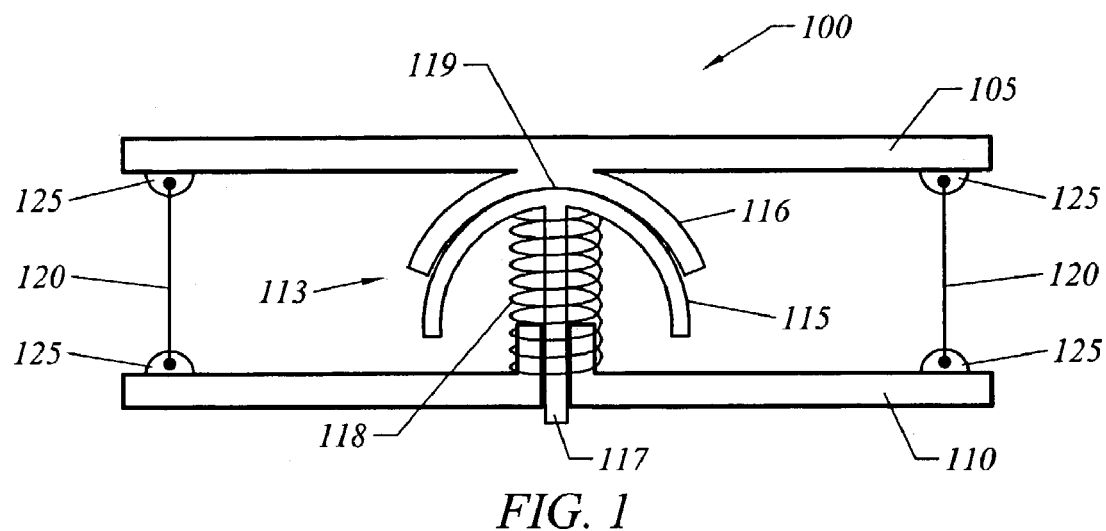
FIG. 1 is a cross section view of one exemplary embodiment of a positioning assembly according to the invention.

Referring to the figures, wherein like numerals indicate like or corresponding parts throughout the several views, there is shown in FIG. 1 a cross section view of an exemplary positioning apparatus 100 for moving a moveable structure 105 relative to a support structure 110 about a pivot point 119. Three shape memory alloy (SMA) actuators 120 (two of which are visible in the view of FIG. 1) are attached to the moveable structure 105 and the support structure 110 via attachment points 125. The SMA actuators are unidirectional in nature meaning that when actuated they impart a tensile or traction force against the moveable structure 105 and each other. Moveable structure 105 has a socket 116 with a complementary shape to engage with ball 115 of the compliant support 113. A compliant support 113 is disposed between the moveable structure 105 and the support structure 110. The compliant support 113 includes a ball 115 in slideable relation to the socket 116. The ball 115 includes a support stem 117. A bias element 118 is preferably disposed about the support stem 117 and is in contact with the underside of ball 115. The bias element 118 urges the ball 115 into contact with the socket 116. The resulting configuration is that the compliant support 113 is urged into contact with the moveable structure 105 to (1) provide a single pivot point 119 and (2) bias the moveable structure 105 away from the support structure 110. The invention may also be implemented with a fixed support stem 117 and without a bias element 118. The pivot structure 113 may be, for example, a conventional hemispherical pivot support structure sized and selected based upon the specific application to be used. Motion limiters and overtravel restraints necessary for stability against large external disturbances are not shown.

Friction built into the compliant structure provides stability against normal vibrational disturbances. The three actuators 120 are chosen for their ability to provide traction forces.

Three SMA actuators 120 are disposed between the moveable structure 105 and the support structure 110. The SMA actuators 120 have a two-fold purpose in positioning assemblies of the present invention. First, the SMA actuators 120 are used to oppose the bias force of the moveable structure 105 away from the support structure 110. Second, the SMA actuators 120 are shaped, sized and positioned such that the generated actuation forces will accommodate a payload disposed on the moveable structure 105, while overcoming friction and bias forces generated by contact with the pivot structure 113. Applications requiring either or both of (1) massive payloads on the moveable structure 105 and (2) high moveable structure stability will involve larger bias forces being generated within the compliant support 113. Larger bias forces will in turn lead to the requirement for larger and more powerful SMA actuators to oppose the bias forces and/or position more massive payloads.

The three SMA actuators 120 in positioning apparatus 100 (two SMA actuators 120 are shown) may be single strand SMA wires. Applying power, such as electric current, to the SMA wire 120 will result in the thermoelastic contraction of the SMA wire along its longitudinal axis. As illustrated in FIG. 1, the SMA actuator 120 is advantageously positioned between and attached to the moveable structure 105 and the support structure 110 so that the SMA actuator 120 is nearly perpendicular to the surface of each of the moveable structure 105 and the support structure 110. Put another way, the longitudinal axis of the SMA actuator 120 (i.e., the actuation axis of the SMA actuator 120) is positioned to optimally apply the actuation forces generated by the SMA actuator 120 to the moveable structure. Unlike conventional actuator systems, the actuator arrangements of unidirectional SMA actuators of the present invention advantageously correct for azimuthal misorientation. Since the actuators 120 operate in traction, azimuthal misorientation (yaw) of the moveable structure 105 relative to the support structure 110 will be self limiting and self correcting because once an actuator is positioned, it will not move until a force is applied against it by another actuator. When that force is no longer applied, the actuators remain in traction in their new position. Thus, azimuthal misorientation is minimized.

Figure 2:
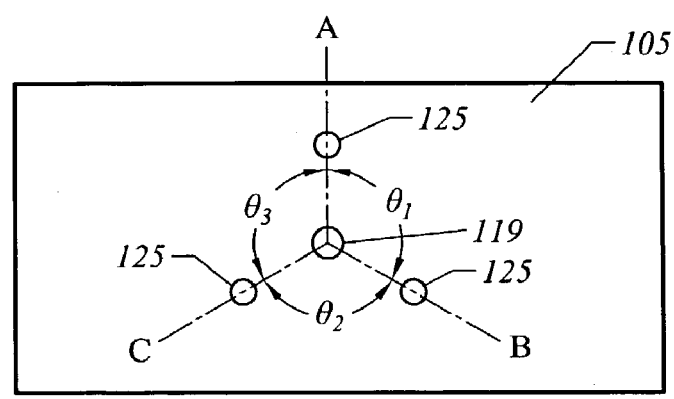
FIG. 2 is a bottom view of the exemplary embodiment moveable structure of FIG. 1.

FIG. 2 illustrates a bottom up view of the moveable support member 105 of FIG. 1. The SMA attachment points 125, the pivot point 119 and the moveable structure 105, as illustrated. The angular separation and arrangement of the attachment points 125 about pivot point 119 is made clear by reference to angles $\theta_1$, $\theta_2$ and $\theta_3$. The angles $\theta_1$, $\theta_2$ and $\theta_3$ refer to the angular arrangement of the SMA actuator attachment points 125. In a preferred embodiment, the SMA actuator connection points 125 are symmetrically arranged about the compliant support, provided in this embodiment by pivot structure 113. In another preferred embodiment, the attachment point separation angles $\theta_1$, $\theta_2$ and $\theta_3$ are substantially equal. In a specific embodiment, the separation angles $\theta_1$, $\theta_2$ and $\theta_3$ are each 120°. In an alternative embodiment, the SMA actuator connection points 125 may be arranged in a configuration whereby the thermoelastic contraction of one actuator results in the extension of another actuator from a contracted condition to an extended condition. Other antagonistic actuator configurations are possible, such as, for example, where the thermoelastic contraction of two of the SMA actuators results in the extension of the third SMA actuator.

Figure 3:
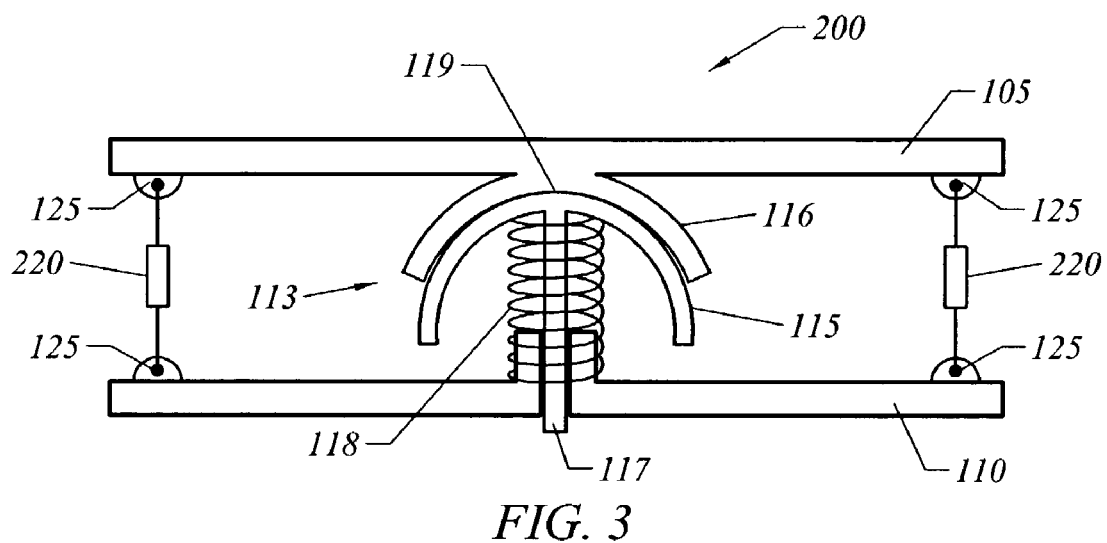
FIG. 3 is a cross section view of another exemplary embodiment of a positioning assembly according to the invention.

FIG. 3 illustrates another alternative embodiment of an SMA actuated positioning apparatus 200 according to the invention. Positioning apparatus 200 is structurally similar to positioning apparatus 100 in the use of a moveable structure 105, support structure 110 and compliant support 113 (FIG. 1). However, instead of a single strand SMA wire 120 to provide the actuation force to position moveable member 105, positioning apparatus 200 employs an SMA actuator 220. Three SMA actuators 220 are disposed between the moveable structure 105 and the support structure 110 and are connected to each by suitably configured attachment points 125. While only two SMA actuators 220 are illustrated in FIG. 3, three SMA actuators 220 are advantageously employed to provide two degrees of angular freedom of the moveable structure 105 about the pivot point 119 as shown and described above with regard to SMA actuators 120 (FIG. 1 and FIG. 2).

Figure 4:
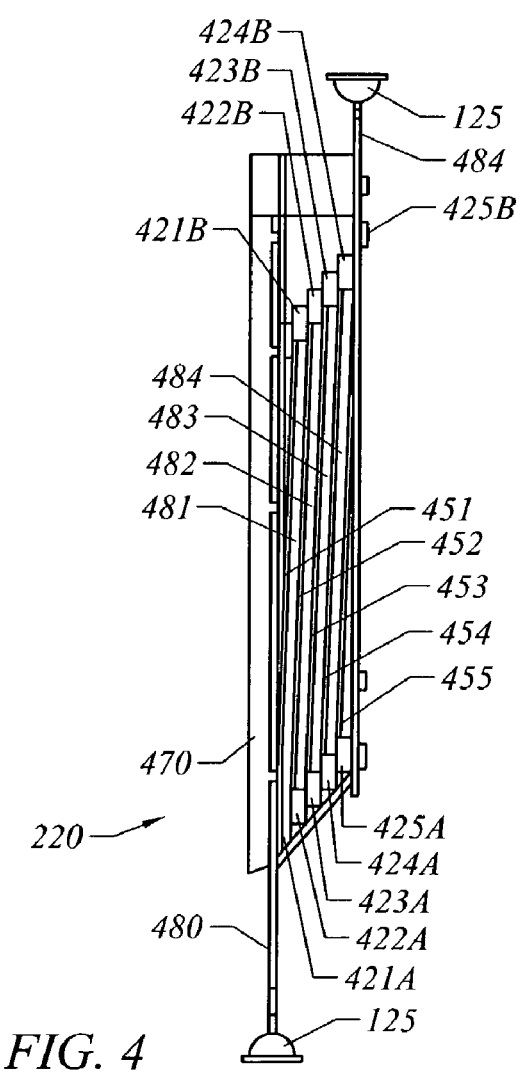
FIG. 4 is a cross section view of a representative sliding plane type shape memory alloy actuator.

The unique configuration of SMA actuators 220 will be made clear with reference to the cross-section view of an SMA actuator 220 (FIG. 4). The shape memory alloy actuator 220 comprises a set of stacked parallel conductive plates having shape alloy links connecting adjacent plates inside of a casing 470. These plates are stacked into a parallel array, with plate 480 being the lowest, followed in succession by plates 481 through 483, and topped by plate 484. Each plate is made of a material that is rigid yet soft enough to permit crimping of the material onto the SMA wires 451 through 455 at crimp joints 421A and 421B through 425A and 425B respectively without damaging the wires (excessive compression of the SMA wires causes fragility and change in transition properties). A suitable material for the plates is a half hard cartridge brass. Other methods of attachment of the wires may be used, but crimping is an attractive method for ease, economy, and not increasing the size of the assembled actuator. Other aspects, details and embodiments of the parallel plate, shape memory alloy actuator 220 can be found in co-pending U.S. patent application Ser. No. 09/637,713 entitled "Shape Memory Actuators and Control Methods" filed Aug. 11, 2000, and incorporated herein by reference in its entirety. The parallel plate, shape memory alloy actuator 220 may also be any of several SMA based linear actuators commercially available from NanoMuscle, Inc. headquartered in Antioch, Calif. Representative NanoMuscle linear actuators are available under the model names NM 30, NM 70 and NM 125 and are further described at www.nanomuscle.com.

While the above embodiments have been described with regard to single strand and sliding plane SMA unidirectional actuators, it is to be appreciated that other additional embodiments include the use of other actuators, such as conventional actuators, including actuators that employ electromagnetic forces, or other conventional actuators readily apparent to those of ordinary skill in the art. Other conventional actuators may be substituted into the above description in accordance with these other embodiments of the present invention.

Figure 5:
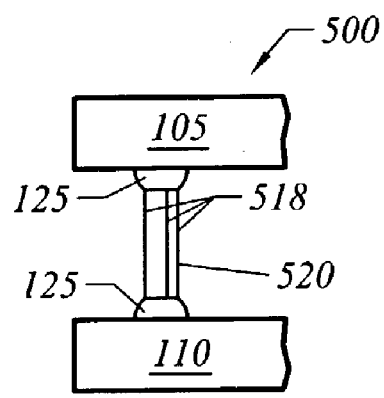
FIG. 5 is a cross section view of a representative multiple wire strand shape memory alloy actuator.

Another alternative embodiment employing SMA based actuators according to the present invention is illustrated in FIG. 5. FIG. 5 illustrates a partial cross section view of an alternative positioning apparatus 500 that is structurally similar to the positioning apparatus 100 in the use of a moveable structure 105, support structure 110 and compliant support 113 (FIG. 1). In this embodiment, a plurality of SMA wire strands 518 are arranged between connection points 125 and together comprise an SMA actuator 520. As described above with regard to SMA actuators 120 and 220, three SMA actuators 520 are similarly employed and arranged to provide two degrees of freedom of angular movement for the moveable structure 105 about a pivot point 119. One key advantage of the SMA actuator 520 is that the amount of SMA contraction force may be adjusted by adding additional SMA wires or elements 518. In this configuration, the amount of actuation force generated is directly proportional to the number of SMA wires used in an actuator. In this manner, the simple single strand, individually electrically controlled SMA actuator configuration described above (FIG. 1) may be advantageously employed in applications where either or both of (1) a massive payload is present on the moveable structure 105 or (2) a large bias force is generated to provide a more stable moveable structure 105. It is to be appreciated that while the plurality of strands making up the SMA actuator 520 are mechanically connected in parallel, electrically they may be connected in series or parallel, depending upon the desired actuation sequence for the strands.

Figure 6A:
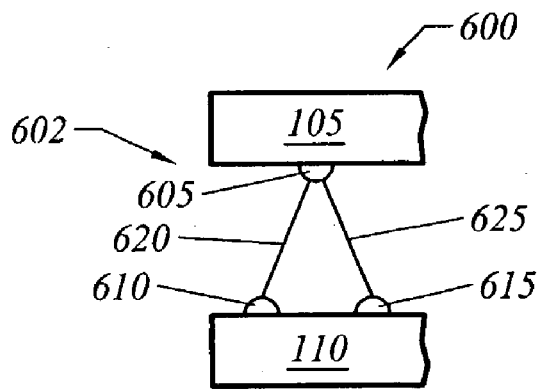
FIG. 6A is a cross section view of a representative configuration for a single strand shape memory alloy wire actuator.

Another alternative embodiment of the present invention may be appreciated by turning to FIG. 6A. FIG. 6A illustrates a partial cross section view of an alternative positioning apparatus 600 that is structurally similar to positioning apparatus 100 in the use of a moveable structure 105, support structure 110 and compliant support 113 (FIG. 1). Positioning apparatus 600 employs three SMA actuator assemblies 602 to provide two degrees of freedom motion for moveable structure 105. Each of the three SMA actuator assemblies is similarly configured and includes, generally, a plurality of SMA wires (620, 625) connected individually to one of the moveable structure 105 or support structure 110 and collectively at a single point to the other of the moveable structure 105 or support structure 110. In the embodiment illustrated in FIG. 6A, the SMA wires 620, 625 are individually connected to the support structure 110 and collectively to the moveable structure 105 via single attachment point 605. More specifically, SMA wire 620 is connected to the support structure 110 at suitable connection point 610 and to the moveable structure 105 at common connection point 605. Likewise, SMA wire 625 is connected to the support structure 110 at a suitable connection point 615 and to the moveable structure 105 at common connection point 605. It is to be appreciated that each of the SMA wires 620, 625 may be selectively, electronically actuated to generate an SMA induced positioning force.

Another unique aspect of the positioning apparatus 600 is the manner that the SMA actuators 602 are positioned relative to the moveable structure 105, the support structure 110 and the compliant support 113. In one embodiment of the positioning apparatus 600, symmetrical arrangement of the SMA actuators 602 is provided by disposing the attachment points 605 on the moveable structure in a symmetrical angular arrangement about the pivot point 119 (FIG. 2). In a specific embodiment, the three attachment points 605 are each equidistant from the pivot point 119 as measured along the surface of the moveable structure 105. In an alternative embodiment, the SMA actuators 602 may also be symmetrically arranged through the placement on the attachment points 610 and 615 on the support structure 110 about an axis extending through the pivot point 119 and normal to each of the moveable structure 105 and support structure 110.

Figure 6B:
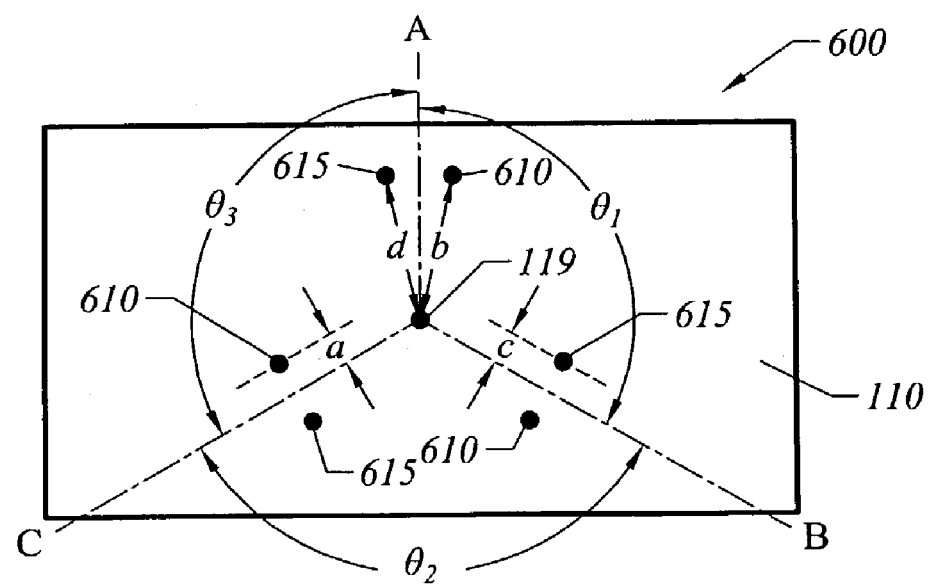
FIG. 6B is a top down view of the support structure of an illustrative single strand shape memory alloy actuator of FIG. 6A which can be used in accordance with an embodiment of the present invention.

The configurations of the SMA actuator attachment points 610, 615 may be better appreciated with reference to FIG. 6B. FIG. 6B is a top down view of three pairs of SMA actuator attachment points 610, 615 disposed about pivot point 119 on the surface of support structure 110. One specific embodiment is illustrated in FIG. 6B where each SMA actuator attachment point pair 615 and 610 is in turn equally spaced from the dashed lines indicating symmetrical angular separation about pivot point 119 (i.e. the case where $\theta_1$, $\theta_2$ and $\theta_3$ are all equal). In this case, the attachment point 610 separation distance "a" is equal to the attachment point 615 separation distance "c." In another alternative embodiment, either or both of the attachment points 610, 615 for each SMA actuator 602 are equidistant from the pivot point 119. In one specific embodiment, each attachment point 610 separation distance "b" is equal. In another specific embodiment, each attachment point 615 separation distance "d" is equal. In yet another specific embodiment, each of the attachment point 615 separation distances "d" are equal to each of the attachment point 610 separation distances "b." In another alternative embodiment, each of the three SMA actuator attachment points 610 is equidistant from pivot point 119 (i.e., all distances "b" are equal) and are situated a fixed distance from the nearest line of symmetrical angular separation (i.e., separation distance "a").

Additional embodiments of the SMA actuator positioning concepts of FIGS. 6A and 6B will now be discussed with reference to FIGS. 3 and 5. It is to be appreciated that the use of multiple individual SMA actuator attachment points and single common SMA actuator attachment points may be implemented using SMA actuators 220 and 520. For example, consider SMA actuator 520 of FIG. 5. In accordance with the descriptions and teachings above with regard to FIGS. 6A and 6B, the SMA actuator 520 may continue to use a single common connection point 125 on moveable member 105. However, instead of a single connection point 125 on support structure 110 for all SMA wires 518 (FIG. 5), each SMA wire 518 would instead be connected to an individual attachment point (i.e., as in SMA attachment points 610 and 615 of FIG. 6A and 6B). The various embodiments and configurations of the SMA wires 518 are similarly arranged as discussed above for positioning SMA actuator attachment points 610, 615 relative to one another, the pivot point 119, and the lines of symmetrical angular separation about the pivot point 119 (i.e., dashed lines delineating $\theta_1$, $\theta_2$ and $\theta_3$). With regard to FIG. 3, embodiments of the invention using a plurality of SMA actuators 220 are envisioned. In these embodiments, each of the plurality of SMA actuators 220 may be individually attached to one surface and collectively attached to another surface. The SMA actuator attachment points in these embodiments may be arranged according to the various advantageous spatial relationships described above with regard to FIGS. 2, 6A and 6B.

It is to be appreciated that in each of the above embodiments where the single common SMA attachment is on the moveable member and the multiple individual SMA attachment points are on the support structure other alternative embodiments are available. Other alternative embodiments would include, for example, embodiments where the single common SMA attachment point is on the support structure and the multiple SMA attachment points are on the moveable structure. One exemplary embodiment will now be described with regard to FIG. 6A. In this embodiment, the individual SMA attachment points 610 and 615 would be on moveable member 105 and SMA attachment point 605 would be on support structure 110.

Figure 7:
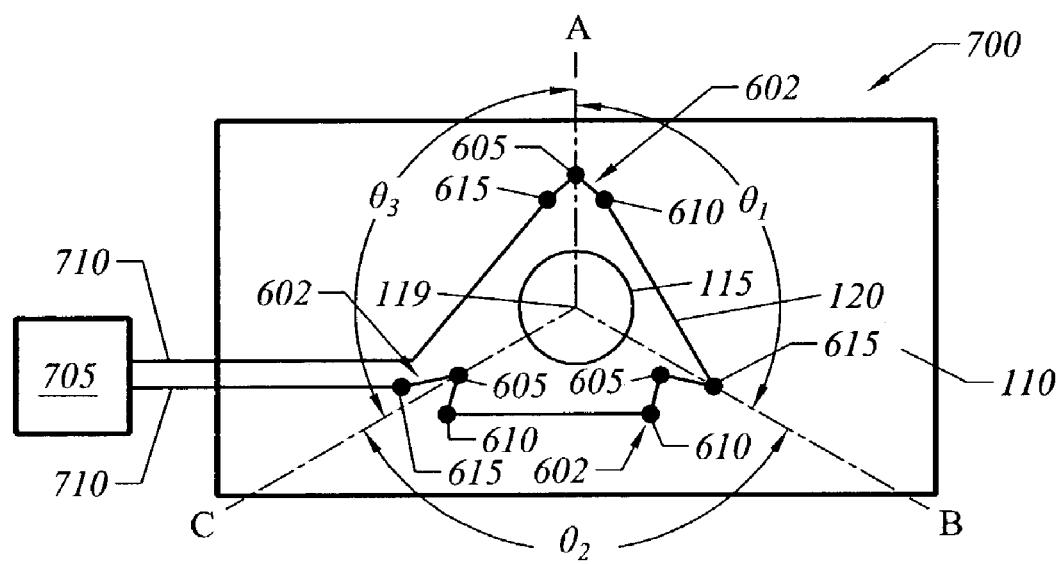
FIG. 7 is a top down view of the support structure of an illustrative single strand shape memory alloy actuator of FIG. 6A which can be used in accordance with an embodiment of the present invention.

FIG. 7 illustrates an embodiment of a positioning apparatus 700 of the present invention. FIG. 7 is a top down view of support structure 110. In this embodiment, a single strand of SMA wire 120 is strung along the support structure 110 top surface and up to attachment points on the moveable member 105 (i.e., FIG. 6A). For clarity in explaining the various control circuits, attachment points 605, while not attached to the top surface of support structure 110, are illustrated in FIG. 7 for purposes of discussion. The SMA actuators 602 are disposed about support structure 110 as described above, and a single continuous strand of SMA wire is used for each SMA actuation segment 620, 625 (FIG. 6A). Suitable connectors 710 electrically connect control circuitry 705 to the SMA wire 120 at appropriate points to provide selective individual or group activation of the SMA wire 120. In this context, activation refers to the application of external energy, here electrical current, to an SMA actuation element sufficient to cause a thermoelastic phase change of that SMA element to produce austenite phase contraction of the SMA actuation element. Control circuitry 705 may be any suitable electrical control system capable of selectively, electrically activating the SMA actuation elements used in embodiments of the present invention. Several alternative control circuit configurations will now be discussed with reference to FIGS. 8, 10, 11 and 12.

Although in FIG. 7 there are shown wire segments between adjacent ones of the attachment points 610, such wire segments may be conveniently chosen to have zero length, or to consist of non-SMA materials. The choice of zero length might be taken to avoid supplying electrical power to a mechanically parasitic portion of the wire (one which does not contribute to relative movement between the support structure 110 and the moving structure 105). Alternatively, the same purpose would be served by splicing non-SMA wire at the same locations (between adjacent mechanical connection points 610).

Figure 8:
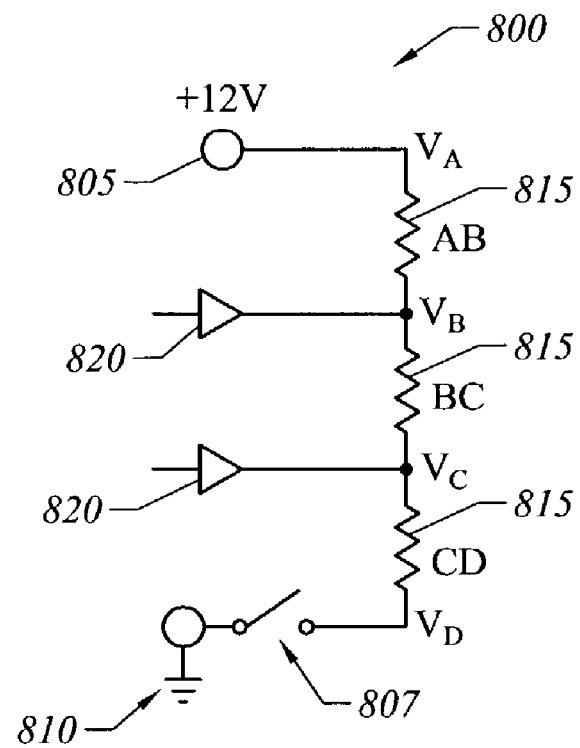
FIG. 8 is an electrical schematic diagram of a shape memory alloy actuator control circuit utilizing voltage controllers in accordance with an embodiment of the invention.
Figure 9:
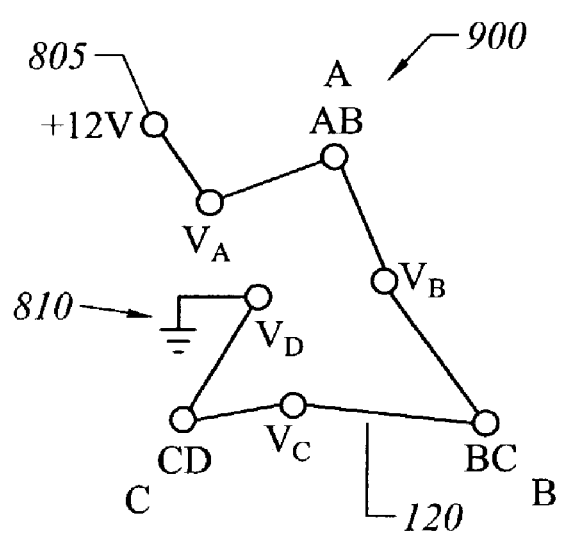
FIG. 9 illustrates an embodiment of the control circuit of FIG. 8 in the single strand shape memory alloy wire actuator assembly of FIG. 7 in accordance with an embodiment of the invention.

FIG. 8 illustrates a control circuit 800 in which the SMA actuators are electrically represented as resistors 815 connected in series, voltage regulators 820, an electrical potential 805, ground potential 810 and on/off switch 807. $V_A$, $V_B$, $V_C$ and $V_D$ refer to the electrical potentials between which the SMA actuators are placed. FIG. 9 illustrates an alternative simplified view 900 of the actuator arrangement in FIG. 7. Taken in conjunction with FIGS. 7 and 8, FIG. 9 illustrates how the voltage regulators 820 of FIG. 8 may be employed to selectively activate the SMA actuators A, B and C. For purposes of discussion, the SMA actuators 602 (numeral not visible in the figure) are named Actuator A (12 o'clock position of FIG. 7), Actuator B (5 o'clock position of FIG. 7) and Actuator C (8 o'clock position of FIG. 7). The designations Actuator A, B and C apply to other embodiments as well. With respect to FIGS. 8 and 9, the identity and operation of the actuators may be further clarified as follows: Actuator AB consists of two portions (or strands) of SMA forming a mechanical parallel connection between the support structure 110 and the movable structure 105, as well as an electrically series connection between voltage control points $V_A$ and $V_B$. Thus, the electrical midpoint of the resistor representing actuator AB in FIG. 8, i.e. the point where the two portions of SMA wire meet, is mechanically fastened to the movable structure and forms one mechanical endpoint of that actuator. The two electrical endpoints of the actuator AB (designated by $V_A$ and $V_B$ in FIGS. 8 and 9) taken collectively, form the other mechanical endpoint of actuator AB. The same meaning and nomenclature applies to the other two actuators, in FIGS. 8 and 9.

Figure 10:
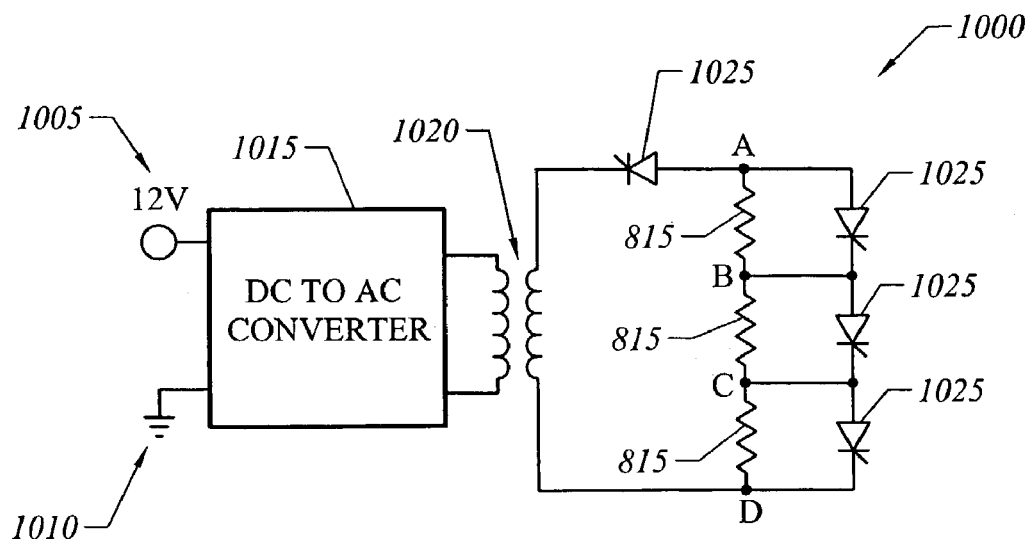
FIG. 10 is an electrical schematic diagram of a shape memory alloy actuator control circuit utilizing silicon controlled rectifiers in accordance with an embodiment of the invention.
Figure 11:
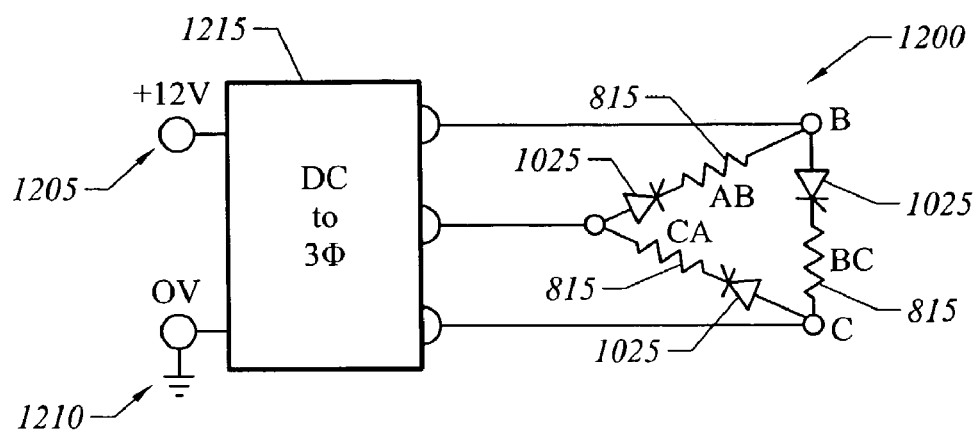
FIG. 11 is an electrical schematic diagram of a shape memory alloy actuator control circuit utilizing three-phase power and silicon controlled rectifiers in accordance with an embodiment of the invention.

FIGS. 10 and 11 illustrate control circuits suited to either AC, DC or 3 phase power supplied for SMA actuation. FIG. 10 illustrates a potential 1005, a second potential 1010 and a DC to AC converter 1015, a transformer 1020. In this figure, the SMA actuators are represented as resistors 815 arranged in series with silicon controlled rectifiers 1025.

FIG. 11 illustrates electrical control circuits suited to the use of three phase power. FIG. 11 illustrates one possible manner to use 3 phase power controller 1200 to selectively activate the SMA actuators. In this embodiment, a DC potential 1205 is applied to DC to 3 phase converter 1215. The three output phases of the DC to 3 phase transformer 1215 are then applied to the combination of the three SMA actuators AB, BC, CA symbolically indicated in FIG. 11 as resistors 815 connected in a delta configuration, with each actuator leg having an SCR 1025 (i.e., silicon controlled rectifier) controller arranged in series combination with the respective phase, so as to selectively activate the SMA actuators. Unlike the DC power configuration described in previous embodiments, the formerly distinct ends A and D of the actuator's series combination have now degenerated into a common electrical terminal designated A in FIG. 11.

Figure 12:
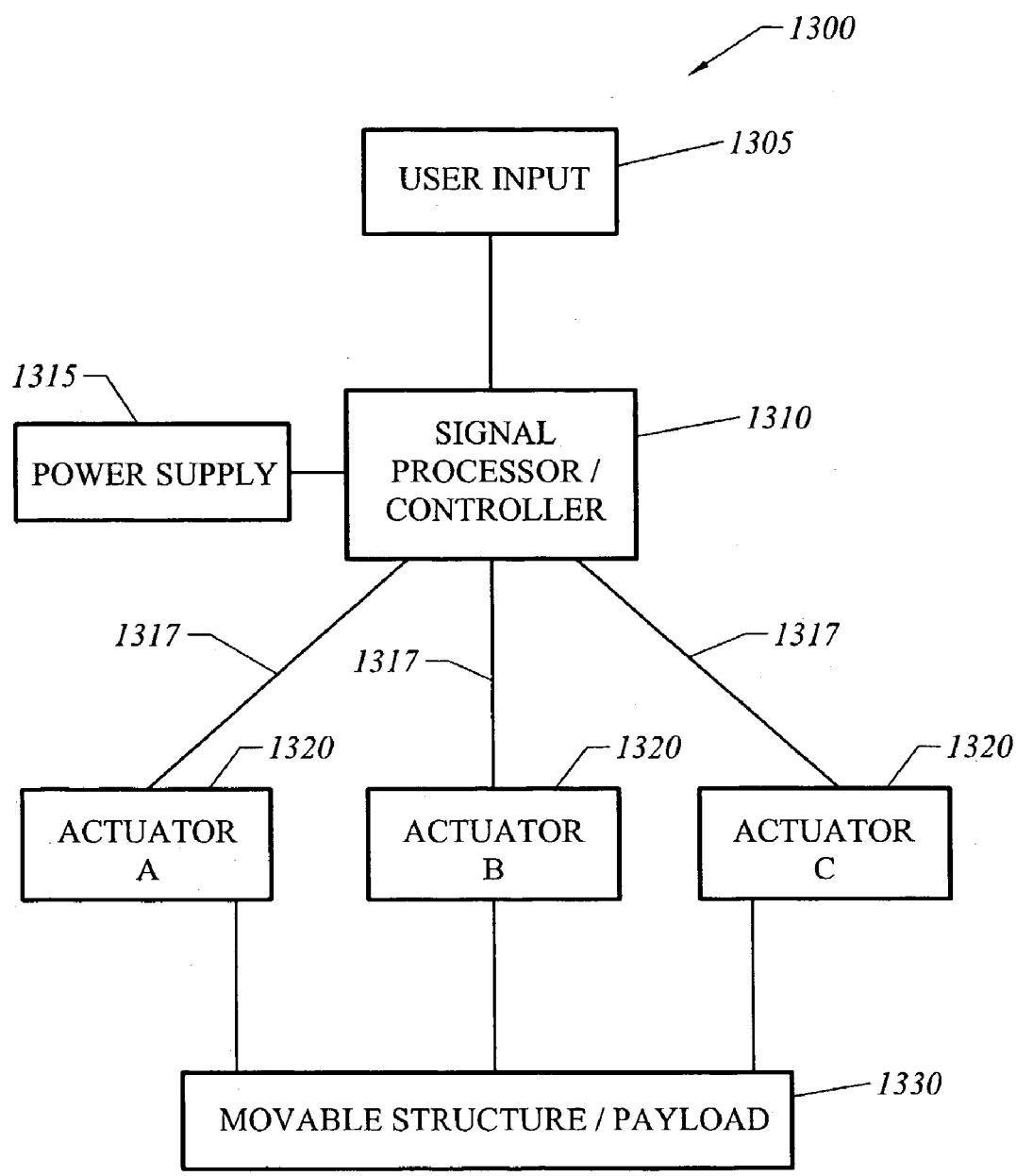
FIG. 12 is a block diagram of a representative control system for a shape memory alloy actuator system in accordance with an embodiment of the invention.

The overall operation of the various embodiments of the invention may be understood with reference to FIG. 12. FIG. 12 illustrates a control configuration of an SMA actuator based positioning system 1300. Actuators A, B, C 1320 are supported by a suitable mechanical base (not shown) and attached to a moveable structure or payload 1330 as shown and described above. In one embodiment, the actuators may be any of the above described SMA type actuators. A suitable power supply 1315, such as but not limited to the DC, AC and 3 phase power supplies described above is electrically connected to the actuators 1320 via a signal processor/controller 1310 and control lines 1317. User inputs 1305 are supplied to the signal processor/controller 1310 to indicate desired moveable structure/payload 1330 movement. In the case where the moveable structure/payload 1330 is a vehicle rearview mirror, user inputs 1305 may come in the form of an electrical signal generated by, for example, the deflection of a lever to indicate desired mirror movement. The signal processor/controller 1310 converts the desired movement indicated by user input 1305 into the selective activation energy to be provided, as needed, to each, all or combinations of the SMA actuation elements in each of the actuators 1320 to produce the desired moveable structure/payload 1330 movement.

Figure 13A:
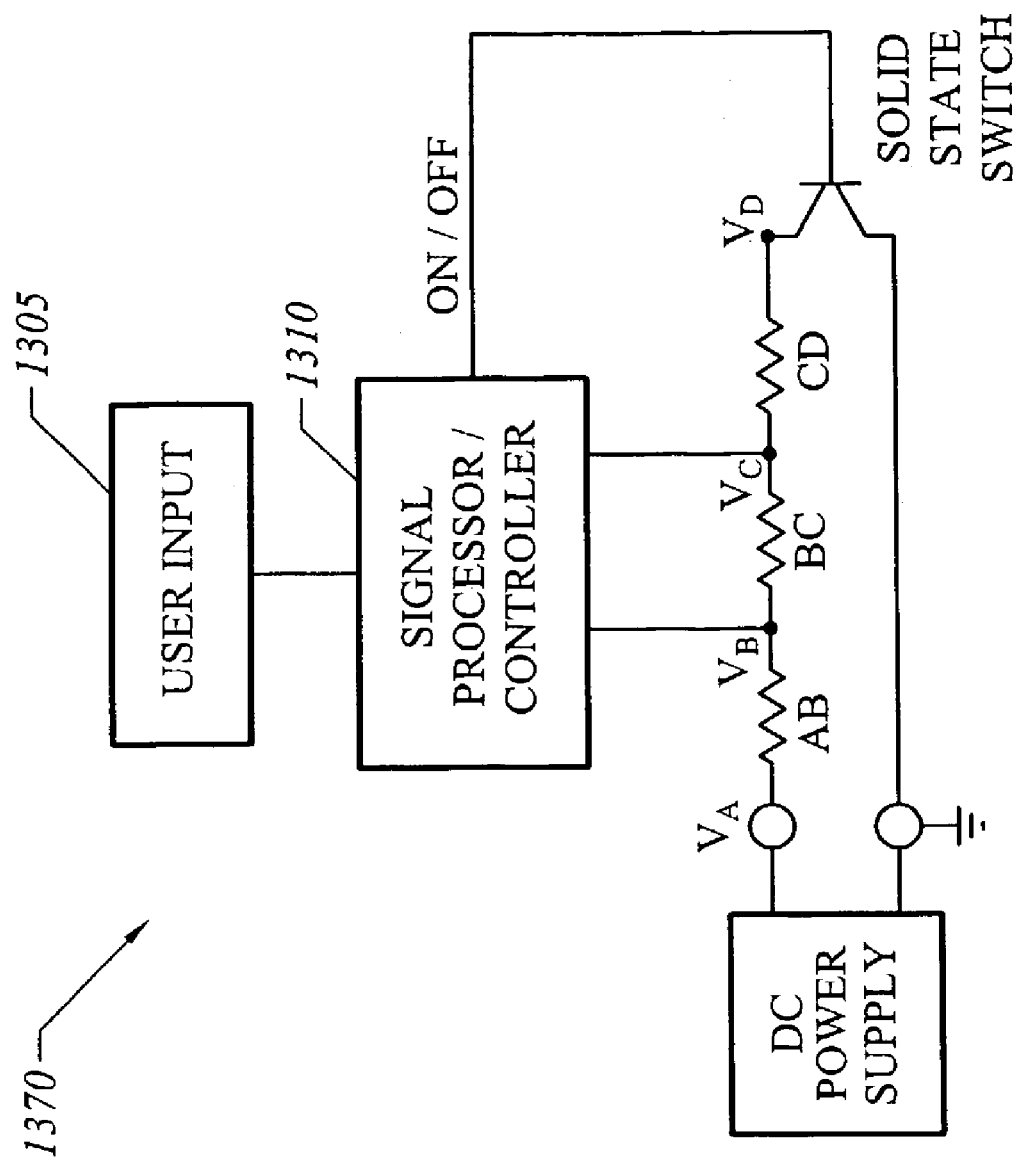
FIGS. 13A, 13B and 13C are block diagrams of the control system of FIG. 12 incorporating the electrical controls of FIGS. 8, 11, and 10, respectively.
Figure 13B:
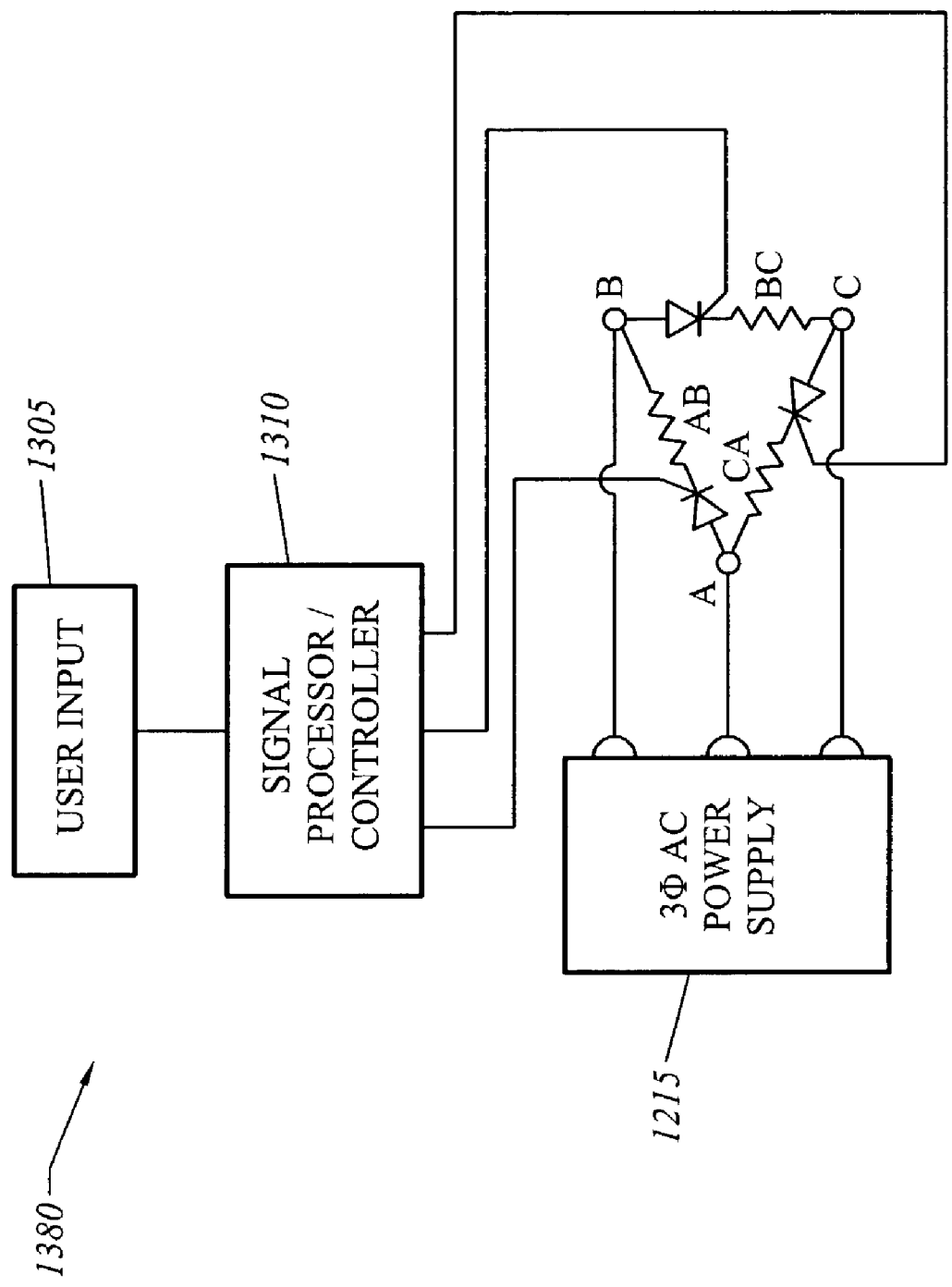
Figure 13C:
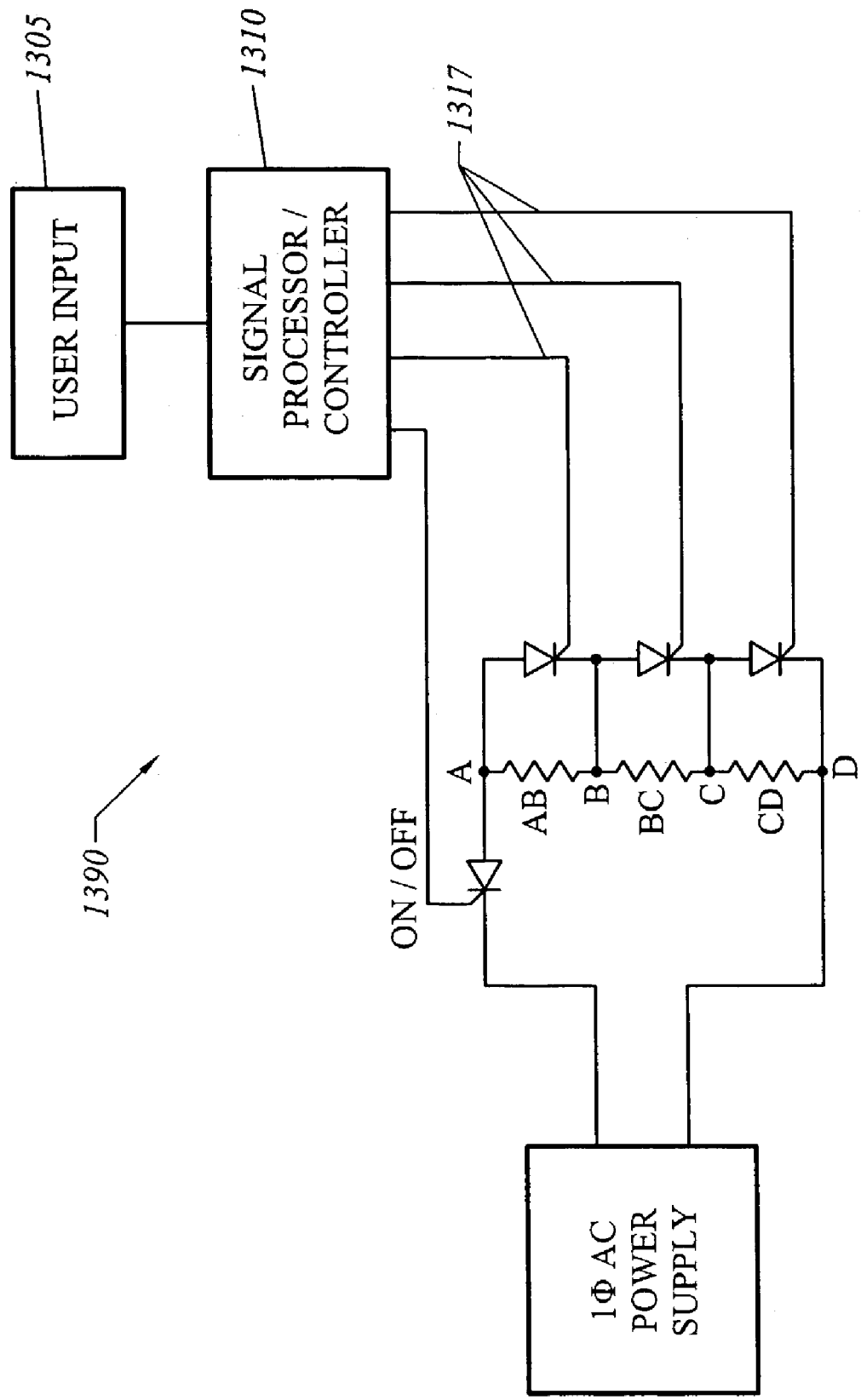

FIGS. 13A, 13B, and 13C represent specific embodiments of the control configuration of an SMA actuator based positioning system 1300. FIG. 13A represents the control configuration of an SMA actuator based positioning system 1370 that utilizes the electrical control system described above with regard to FIG. 8. FIG. 13B represents the control configuration of an SMA actuator based positioning system 1380 that utilizes the electrical control system described above with regard to FIG. 11. FIG. 13C represents the control configuration of an SMA actuator based positioning system 1390 that utilizes the electrical control system described above with regard to FIG. 10. The several different electrical control configurations in the various above embodiments have been provided for purposes of illustration and not limitation. A wide variety of conventional electrical control systems are available and may be used with embodiments of the present invention so long as the electrical control system provides the needed selective, electrical activation of the actuator elements. In addition, other aspects, details and embodiments of suitable SMA actuator electrical control system embodiments can be found in co-pending U.S. patent application Ser. No. 09/637,713 entitled "Shape Memory Actuators and Control Methods" filed 11 Aug. 2000, which is incorporated herein by reference in its entirety.

In the embodiments described above, the actuators may be conveniently chosen to be of the SMA wire type. In such cases, typical wire diameters may range between on thousandth of an inch to several thousandths of an inch depending on the payload size (its moments of inertia about the relevant axes of rotation) and the speed required (rotation rate). Typical rotation rates for rear view mirror applications are in the range of a few degrees per second. Higher or lower rates may be required for other payloads, such as telescopes, cameras, etc. The load on the actuator will be proportional to the product of a suitable component of the angular rotation rate and the appropriate moment of inertia. Applications of the present invention are wide ranging. Virtually any type of payload may be positioned. Pointing applications such as laser alignments, laser pointers, targeting acquisition illumination, and target designators, for example, may be advantageously performed by embodiments of the present invention. In addition, heavy duty applications, such as the positioning of very massive loads, such as a howitzer barrel, or other military payload application requiring quick movement of a large mass with few moving parts and robust design may also be performed. Moreover, the suitably sized actuators for positioning such massive loads may, for example, employ the high power, 3 phase control configurations described above.

The foregoing exemplary descriptions and the illustrative preferred embodiments of the present invention have been explained in the drawings and described in detail, with varying modifications and alternative embodiments being taught. While aspects of the invention have been shown, described and illustrated, it is to be appreciated by those skilled in the art that equivalent changes in form and detail may be made therein without departing from the true spirit and scope of the invention, and that the scope of the present invention is to be limited only by the claims that follow.

I claim:

1. An apparatus for positioning a moveable structure relative to a support structure, comprising:
    a moveable structure;
    a support structure;
    a compliant support disposed between the moveable structure and the support structure, the compliant support including a socket on the moveable structure, a ball moveably attached to the support structure via an integral stem, and a spring disposed about the stem for urging the ball away from the support structure, the stem extending through an opening in the support structure, the compliant support biasing the moveable structure away from the support structure; and
    only three shape memory alloy actuators, the three shape memory alloy actuators symmetrically arranged about the compliant support wherein each shape memory alloy actuator is attached to the moveable structure and the support structure whereby selectively activating the three shape memory alloy actuators provides two degrees of freedom of movement for the moveable structure relative to the support structure.

2. The apparatus for positioning a moveable structure according to claim 1 wherein the three shape memory alloy actuators are provided by stringing a single strand of shape memory alloy wire between the moveable structure and the support structure such that each shape memory alloy actuator comprises a first segment disposed between a first connection point on the support structure and a connection point on the moveable structure and a second segment disposed between a second connection point ante support structure and the connection point on the moveable structure.

3. The apparatus for positioning a moveable structure according to claim 2 wherein each of the first segment and second segment on each of the three shape memory alloy actuators is seperably actuable by a control circuit.

4. The apparatus for positioning a moveable structure according to claim 1 wherein each shape memory allay actuator has a single shape memory alloy wire connected to the support structure and the moveable structure.

5. The apparatus for positioning a moveable structure according to claim 4 wherein each shape memory alloy actuator is connected to a control circuit for selectively powering the shape memory alloy actuators.

6. The apparatus for positioning a moveable structure according to claim 5 wherein the control circuit is a voltage controller.

7. The apparatus for positioning a moveable structure according to claim 5 wherein the control circuit is a silicon controlled rectifier.

8. The apparatus for positioning a moveable structure according to claim 1 wherein the moveable structure comprises a mirror.

9. An apparatus for positioning a mirror, comprising:
    a mirror mounted to a moveable structure;
    a support structure;
    a compliant support disposed between the mirror and the support structure, the compliant support including a socket on the moveable structure, a ball moveably attached to the support structure via an integral stem, and a spring disposed about the stem for urging the ball away from the support structure, the stem extending through an opening in the support structure the compliant support biasing the moveable structure away from the support structure; and
    only three linear shape memory alloy actuators, each shape memory alloy actuator connected to the mirror and the support structure and being disposed about the compliant support such that selective activation of individual linear shape memory alloy actuators produces two degrees of freedom for the movement of the mirror.

10. An apparatus for positioning a mirror according to claim 9 wherein the three linear shape memory alloy actuators are symmetrically positioned about the compliant support.

11. An apparatus for positioning a mirror according to claim 9 further comprising a power supply capable of selectively powering the three linear shape memory allow actuators.

12. An apparatus for positioning a mirror according to claim 9 wherein each of the linear shape memory alloy actuators is formed from a singe strand of shape memory alloy wire.

13. An apparatus for positioning a mirror according to claim 9 wherein the shape memory alloy actuators have at least one component selected from the group consisting of: titanium and nickel (TiNi): copper, aluminum and nickel (CuAlNi); and titanium, nickel and palladium (TiNiPd).

14. An apparatus for positioning a moveable structure relative to a support structure, comprising:
    a moveable structure;
    a support structure;
    a compliant support disposed between the moveable structure and the support structure, the compliant support including a socket on the moveable structure, a ball moveably attached to the support structure via an integral stem, and a spring disposed about the stem for urging the ball away from the support structure, the stem extending through an opening in the support structure, the compliant support biasing the moveable structure away from the support structure;

only three shape memory alloy actuators, the three shape memory alloy actuators symmetrically arranged about the compliant support wherein each shape memory alloy actuator is attached to the moveable structure and the support structure whereby selectively activating the three shape memory alloy actuators provides two degrees of freedom of movement for the moveable structure relative to the support structure; and a control circuit connected to each shape memory allow actuator for selectively powering the shape memory alloy actuators.

15. The apparatus for positioning a moveable structure according to claim 14 wherein the moveable structure comprises a mirror.

16. The apparatus for positioning a moveable structure according to claim 15 wherein the three shape memory alloy actuators are provided by stringing a single strand of shape memory alloy wire between the moveable structure and the support structure such that each shape memory alloy actuator comprises a first segment disposed between a first connection point on the support structure and a connection point on the moveable structure and a second segment disposed between a second connection point on the support structure and the connection point on the moveable structure.

17. The apparatus for positioning a moveable structure according to claim 15 wherein each shape memory alloy actuator has a single shape memory alloy wire connected to the support structure and the moveable structure.

18. The apparatus for positioning a mirror according to claim 14 wherein the shape memory alloy actuators have at least one component selected from the group consisting of: titanium and nickel (TiNi); copper, aluminum and nickel (CuAlNi); and titanium, nickel and palladium (TiNiPd).

* * * * *

UNITED STATES PATENT AND TRADEMARK OFFICE
CERTIFICATE OF CORRECTION

| | |
|---|---|
| PATENT NO. | : 7,117,673 B2 |
| APPLICATION NO. | : 10/431174 |
| DATED | : October 10, 2006 |
| INVENTOR(S) | : Andrei Szilagyi |

Page 1 of 1

It is certified that error appears in the above-identified patent and that said Letters Patent is hereby corrected as shown below:

Column 9, Line 65 (Claim 2), "connection point ante support" should read -- connection point and the support --

Signed and Sealed this

Seventh Day of August, 2007

JON W. DUDAS
*Director of the United States Patent and Trademark Office*